Patented Nov. 25, 1924.

1,516,567

UNITED STATES PATENT OFFICE.

HENRY L. HASKELL, OF LUDINGTON, MICHIGAN, ~~ASSIGNOR TO HASKELITE MANU-~~
~~FACTURING CORPORATION, OF GRAND RAPIDS, MICHIGAN, A CORPORATION OF~~
~~MICHIGAN.~~

CEMENT OR WATERPROOF GLUE MATERIAL AND PROCESS OF PREPARING OR MANUFACTURING THE SAME.

No Drawing. Application filed January 26, 1918, Serial No. 213,892. Renewed December 14, 1923.

*To all whom it may concern:*

Be it known that I, HENRY L. HASKELL, a citizen of the United States, residing at Ludington, Michigan, have invented certain new and useful Improvements in Cement or Waterproof Glue Material and Processes of Preparing or Manufacturing the Same, of which the following is a specification.

This application is a continuation in part of application Serial No. 191,154, filed Sept. 13, 1917, with certain modifications and corrections of details.

This invention relates to an improved cement or waterproof glue material and the process of preparing or manufacturing the same.

The objects of this invention are to provide an improved waterproof cement or glue which shall resist the action of the elements in use to an unusual degree and is especially well adapted to cementing or gluing veneer for canoes, boats, or for aeroplanes, including the wings, body and other parts. The cement is also applicable to other kindred uses where waterproof glue or cement is required.

Further objects, and objects relating to details, will definitely appear from the detailed description to follow.

In the preparation of my improved waterproof glue or cement I mix and dissolve black albumen, which is dried blood, in water in the proportion of forty-five (45) per cent of blood to fifty-five (55) per cent of water by weight and stir the same to dissolve the said black albumen as fully as it is possible to do it at the usual atmospheric temperature of a room at, say, about 70°. I place this material in a suitable stirring apparatus so that the same is stirred very thoroughly and continuously for several hours, usually about six hours. This insures as complete solution of black albumen or blood in the water as is possible to accomplish at the temperatures indicated and makes a homogeneous mixture. I find also that by introducing the dried blood into a tank and soaking the same for an hour it takes very much less time to admix it and the same can be accomplished in about three hours or even less.

In place of taking the dried blood, fresh blood may be used by a proper degree of evaporation to get the required consistency, or the required consistency may be secured by admixing with the fresh blood a quantity of the dried blood and mixing the same in the same manner and to the same extent as the dried blood is mixed with water as above indicated.

I mix this blood preparation with a heavy grade of silicate of soda in the proportion by weight of five parts of dried blood to one part of silicate of soda solution. The silicate of soda solution is comparable to No. 14 as manufactured and marked by the Grasselli Chemical Company of Cleveland, Ohio, and analysis of such solution shows that the same contains forty-four (44) per cent of commercial disodium silicate. Apparently reaction takes place between these ingredients. I stir and mix the same thoroughly until the mixture has an appearance similar to heavy molasses.

I have thus given the exact amounts of commercial material and the brands I have received and used in this behalf. I find that in practice a solution of silicate of soda may be made use of that is much more dilute in form as compared with the above. It is desirable where the silicate of soda is diluted that a correspondingly less amount of water be used in the blood solution.

Potassium silicate has been found to be the equivalent of sodium silicate in this behalf, these chemicals being known under the group name of water glass.

Where fresh blood is used it may be kept in condition for use by refrigeration and also a very small quantity of boracic acid may be added as a preservative. Boracic acid is the preservative that I prefer to use. No preservative is necessary if the materials are used while fresh, and I have no doubt that other preservatives than boracic acid can be made use of, but I find that that apparently in no way interferes with the quality of the material.

In using this cement it is applied to veneers in the usual way and the veneer is then subjected to a strong heat and pressure, by hydraulic pressure preferably, the heat being substantially at or above the boiling point of water, and is secured by the introduction of steam into the members of the press.

The material when applied and the veneer made from it is of such quality that the cemented veneer can afterward be boiled and molded to shape as desired. Veneer made with this material may be boiled in water indefinitely without injury. I have boiled samples continuously for four months without apparent injury.

While this cement is of especial use in the making of laminated lumber, I desire to state that it can be used for a variety of purposes, it being necessary, however, to apply heat and pressure substantially as indicated to secure a proper joint and the proper transformation of the cement in use. For instance, it might be made use of in applying a layer of wood to canvas backing or layers of wood to canvas or textile material for various purposes; or for the securing of indurated fiber that has been properly prepared and is in condition to be treated or wood to fiber and the like. I have indicated the uses of my cement so far as I am able, but believe that it is capable of many other uses than those which I have indicated.

I have indicated the precise strength of the blood solution that secures maximum results; viz, a forty-five (45) per cent of solid blood content and fifty-five (55) per cent of water. By taking pains it has been possible to make a solution of fifty (50) per cent blood and fifty (50) per cent water, but it is too viscous for ready manipulation with the usual tools of the trade, and great pains is required to secure proper and effective application. The higher the blood content the stronger the cement, and I have found by experimentation that the solution can be handled and produce a less strong but quite satisfactory joint with a solution of thirty (30) per cent solid content of blood to seventy (70) per cent of water. Even lower than this can be used but with a weakened joint.

The ratio of silicate to the blood should be maintained at five parts by weight solid blood content to one part solution of silicate; or to figure the solid content at the ratio of 11⅓ of solid blood content to 1 of dry disodium silicate by weight. There is slight variation possible from these proportions but to secure the thickening or syrupy effect the proportions of blood to silicate cannot be much varied. If a little too much silicate is added, the mixture is thin and not syrupy; and also if there is not enough silicate to insure proper reaction with the blood content, the material still remains thin. There is possible a comparatively small variation from the ratio I have indicated of 11⅓ parts by weight of dried blood to 1 part by weight of the dry disodium silicate. It will be noted, therefore, that eight and eight-tenths (8.8) per cent by weight of dry disodium silicate is added. That is to say, for every one hundred pounds of the dried blood there is added eight and eight-tenths pounds of dry disodium silicate, if the measures are made with accuracy, and this makes about eight per cent of the mixture dry disodium silicate. To work out the problem complete,— if we take 100 pounds of blood solution, 45% of this, or 45 lbs., will be the dried blood. To this is added one-fifth of the weight of the blood; that is, one-fifth of 45 lbs., or 9 lbs. of silicate of soda solution. This silicate of soda solution is 44% dry disodium silicate, and consequently contains 3.96 lbs. of dry disodium silicate and 5.04 lbs. of water. The entire mixture therefore consists of 60.04 lbs. of water, 45 lbs. of dried blood, and 3.96 lbs. of dry disodium silicate, making a total of 109 lbs. The proportions of silicate of soda to the weight of dried blood above referred to are found to be practical under all conditions. I find, however, that it is possible to vary the amount of silicate to blood to a considerable extent and that the proportion of dried silicate to the entire mixture may be reduced to as low as 4% and secure a glue which forms a waterproof joint. Below that percentage the joint is subject more or less to attack by moisture. The glue can also be made with as high as 20% of the dry sodium silicate, but the same becomes very thick and pasty and, of course, while in this condition it will make a waterproof joint but it is very difficult to handle it and use in proper amounts; and, of course, it is wasting material not to secure a proper distribution of the cement in making a joint.

Having thus described my invention, what I claim and desire to secure by Letters Patent, is:

1. The process of preparing a cement consisting of preparing a solution of blood albumen in water in the proportion of about fifty-five (55) per cent of water to forty-five (45) per cent of albumen, thoroughly admixing the same, adding thereto a heavy grade of silicate of soda in the proportion of about nine (9) per cent by weight of the dry disodium silicate to the albumen content, and mixing the same until the mass becomes of a homogeneous syrupy consistency.

2. The process of preparing a cement consisting of preparing a solution of blood albumen in water, adding thereto a heavy grade of silicate of soda in the proportion of about nine (9) per cent by weight of the dry disodium silicate to the albumen content, and mixing the same until the mass becomes of a homogeneous syrupy consistency.

3. The process of preparing a cement consisting of preparing a solution of blood albumen in water in the proportion of about fifty-five (55) parts of water to forty-five (45) parts of albumen, thoroughly admixing the same, adding thereto disodium silicate, and mixing the same until the mass becomes of a homogeneous syrupy consistency.

4. A cement consisting of a solution of blood albumen in water in proportions of about fifty-five (55) parts of water to forty-five (45) parts of the albumen, and a heavy grade of disodium silicate in proportion of about nine (9) per cent by weight to the albumen content thoroughly admixed therewith and of a syrupy consistency.

5. A cement consisting of a solution of blood albumen and a heavy grade of silicate of soda in proportion of about nine (9) per cent by weight to the albumen content thoroughly admixed therewith and of a syrupy consistency.

6. A cement consisting of a mixture of a solution of blood albumen and silicate of soda dissolved and chemically combined together and being of a syrupy consistency.

7. A cement consisting of a mixture of a solution of blood albumen and water glass dissolved and chemically combined together and being of a syrupy consistency.

In witness whereof, I have hereunto set my hand and seal in the presence of two witnesses.

HENRY L. HASKELL. [L. S.]

Witnesses:
LUELLA G. GREENFIELD,
MARGARET L. GLASGOW.

Certificate of Correction.

It is hereby certified that Letters Patent No. 1,516,567, granted November 25, 1924, upon the application of Henry L. Haskell, of Ludington, Michigan, for an improvement in "Cement or Waterproof Glue Material and Processes of Preparing or Manufacturing the Same," were erroneously issued to "Haskelite Manufacturing Corporation, of Grand Rapids, Michigan, a Corporation of Michigan," as assignee of the entire interest in said invention, whereas said Letters Patent should have been issued to the inventor, *said Haskell*, as sole owner of said invention, as shown by the records of assignments in this office; and that the said Letters Patent should be read with this correction therein that the same may conform to the record of the case in the Patent Office.

Signed and sealed this 27th day of January, A. D. 1925.

[SEAL.]

KARL FENNING,
*Acting Commissioner of Patents.*